United States Patent
St. Germain

[15] 3,688,599

[45] Sept. 5, 1972

[54] SAFETY THROTTLE CONTROL FOR SNOWMOBILES AND OTHER VEHICLES

[72] Inventor: Jean St. Germain, Drummondville, Quebec, Canada

[73] Assignee: Gilbert Lapointe, Drummondville, Quebec, Canada

[22] Filed: Dec. 21, 1970

[21] Appl. No.: 99,962

[30] Foreign Application Priority Data
Oct. 16, 1970 Canada..................095821

[52] U.S. Cl. .................................. 74/526, 74/489
[51] Int. Cl. ................................... G05g 5/04
[58] Field of Search .74/489, 488, 526, 501 R, 568 R

[56] References Cited
UNITED STATES PATENTS
1,492,492  4/1924  Talbot..................74/568
2,382,765  8/1945  Zahodiakin...............192/67

FOREIGN PATENTS OR APPLICATIONS
28,767  10/1921  Denmark..................74/489

Primary Examiner—Milton Kaufman
Attorney—Pierre Lesperance

[57] ABSTRACT

A safety throttle control for snowmobiles and other vehicles equipped with a steering handle bar and a throttle control lever mounted on the steering handle. The hand grip on the steering handle is provided with a rotatable eccentric cam with a nut to releasably lock said cam in a selected position opposite said lever, whereby the cam member selectively adjusts the maximum stroke of the lever and, consequently, the maximum speed of the engine.

4 Claims, 8 Drawing Figures

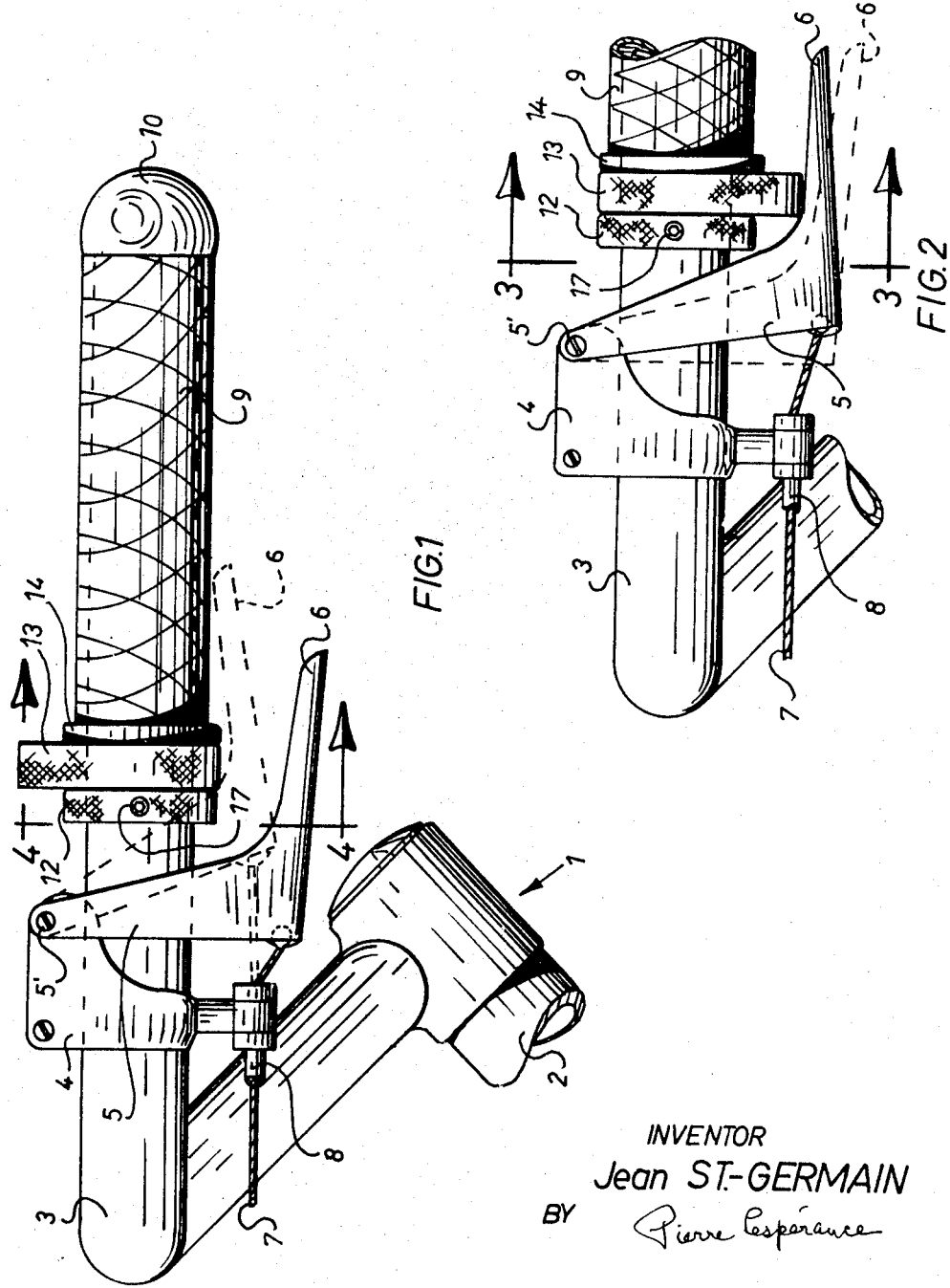

PATENTED SEP 5 1972 3,688,599

INVENTOR
Jean ST.-GERMAIN
BY
Pierre Lespérance
AGENT

SAFETY THROTTLE CONTROL FOR SNOWMOBILES AND OTHER VEHICLES

The present invention relates to a safety throttle control for motor vehicles and, more particularly, to such a control for use in association with snowmobiles and the like vehicles provided with a steering handle and a throttle control lever mounted on the handle.

It is known that snowmobiles, all terrain vehicles and the like are often driven by children lacking prudence and driving the vehicle at excessive speed, resulting in accidents which might be obviated if the maximum speed of the engine vehicle had been limited to less than its nominal value.

One known way of limiting the maximum speed of the engine vehicle is to shorten the throttle cable, thereby limiting the active stroke of the throttle control lever. However, it is time consuming to restore the vehicle engine to its maximum nominal speed whenever desired, for instance when the same vehicle is to be used by an adult, as the entire throttle control cable must be replaced by a standard length cable or other systems which shorten the effective stroke of the cable, must be removed. Moreover, with such a method it is very difficult to adjust the precise maximum speed desired and the adjustment is not progressive.

It is therefore the main object of the present invention to provide a safety throttle control for vehicles equipped with a throttle control lever mounted on a steering handle, which is no way requires replacement or modification of the existing throttle operating mechanism of the vehicle, which can be easily and quickly set to any selected position to limit the maximum stroke of the throttle control lever to any value desired, including the nominal maximum stroke of the lever.

Another object of the invention resides in the provision of a system of the character described, which is of very simple and inexpensive manufacture and which may be fitted on an existing vehicle by any vehicle user.

In accordance with the invention, an abutment cam-like member is movably mounted on the steering handle of the vehicle in the space between said handle and the portion of the throttle control lever spacedly overlying said handle.

The abutment member has a lever abutment surface progressively spaced from said handle and a selected part of said abutment surface can be brought opposite the lever in order to adjust the maximum stroke of said lever to less than its nominal maximum stroke. Means are provided to releasably lock the abutment member in adjusted position. Preferably, the abutment member is in the form of an eccentric annular cam surrounding and rotatably mounted on the handle bar and the locking means consist of a nut clamping the cam member against a shoulder. Preferably, the cam and nut arrangement is mounted on a hand grip modified for that purpose and adapted to be securely fitted on the handle bar.

The foregoing and other objects of the invention will become more apparent during the following disclosure and by referring to the drawings, in which:

FIG. 1 is a side elevation of a vehicle handle bar, throttle lever arrangement and a hand grip and throttle control lever assembly in accordance with the invention, with the cam member in a position allowing maximum stroke of the throttle lever;

FIG. 2 is a similar partial elevation showing the cam member in a position fully limiting the active stroke of the throttle lever;

Figure 3:
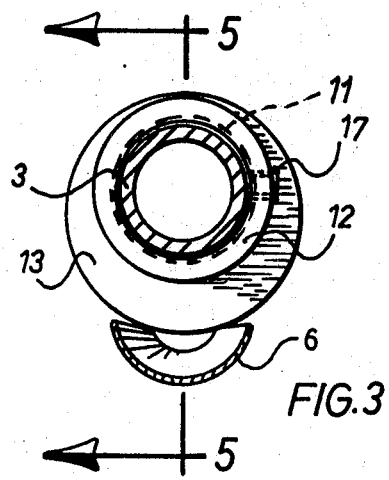
Figure 4:
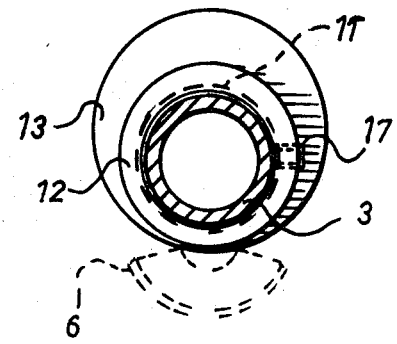
Figure 5:
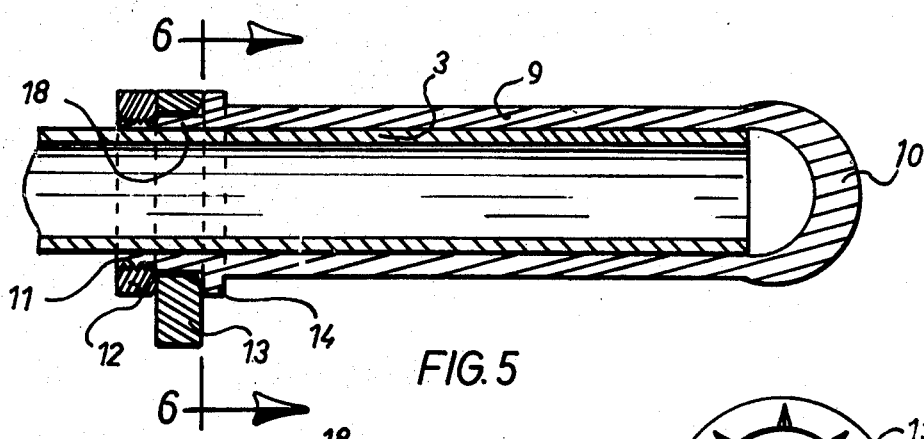
Figure 6:
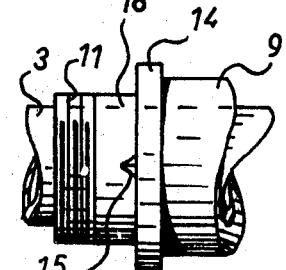
Figure 7:
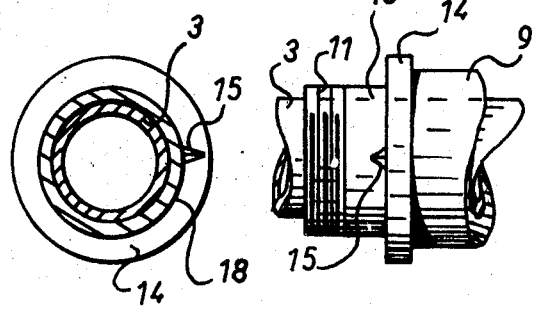
Figure 8:
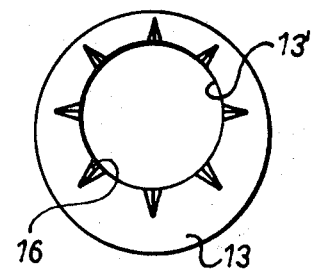

FIGS. 3 and 4 are cross-sections taken along line 3—3 of FIG. 2 and 4—4 of FIG. 1, respectively;

FIG. 5 is a longitudinal section of the assembly taken along line 5—5 of FIG. 3;

FIG. 6 is a cross-section along line 6—6 of FIG. 5;

FIG. 7 is a partial side elevation of the hand grip and handle bar and with the cam and nut removed; and FIG. 8 is an elevation of the cam member.

In the drawings, like reference characters indicate like elements throughout.

FIG. 1 shows, in side elevation, part of a steering handle bar 1 for a snowmobile, motocycle, all terrain vehicle and the like. The handle bar comprises a central steering post 2 and a pair of handles 3, one of which is shown, said handles 3 being of tubular construction. On one of the handles 3 is mounted a throttle actuating assembly comprising a bracket 4, secured to the handle 3, a throttle lever 5 pivotally mounted on bracket 4 at 5' and having a portion 6 overlying the handle 3 in the direction of the outer end thereof. In its rest position, portion 6 is spaced from handle 3.

A throttle actuating cable 7 is attached at lever 5 at one end and to the throttle arm of the engine at the other end. Cable 7 runs through a flexible sheath 8 secured to bracket 4 at one end and to a point close to the vehicle engine at its other end. This standard arrangement is such that, upon depressing of the portion 6 toward handle 3, the engine is accelerated. When the lever 5 is fully depressed to its dotted line position shown in FIG. 1, maximum speed of the engine is obtained.

In accordance with the invention, the usual hand grip, fitted on the handle 3 provided with the throttle lever 5, is removed and replaced by a hand grip 9 modified to carry the abutment member adapted to adjustably limit the working stroke of the throttle lever 5. The hand grip 9 consists of a tubular body made of synthetic resin or the like, closed at its outer end 10 and adapted to tightly engage the handle 3, whereby movement of the hand grip on the handle is prevented. The open end of the hand grip 9 opposite to its closed end 10 forms a threaded portion 11, as shown in FIG. 5, adapted to receive an annular peripherally knurled nut 12. The latter is arranged, when screwed in, to clamp a cam member 13 against a radially outwardly projecting flange 14 integral with the hand grip 9. The cam 13 is in the shape of a ring or annular member, the circular hole 13' of which surrounds the cylindrical portion 18 of the hand grip between the flange 14 and the threaded portion 11. The hole 13' is eccentric with respect to the cylindrical outer portion of the cam 13. The cam has a thickness slightly greater than the width of portion 18. The minimum radial distance of the peripheral portion of cam 13 from the center of rotation is about equal to the radius of flange 14, whereas the distance of the portion of the cylindrical surface of the cam 13 farthest from the center of rotation is preferably about 1.4 to 1.5 times the afore-mentioned minimum distance. When nut 12 is unscrewed, the cam member 13 is free to rotate on the hand grip, whereby its angular position can be adjusted. Then the nut 12 is screwed to clamp the cam member 13 in adjusted position.

To further positively maintain the cam member against rotation with respect to the hand grip 9, flange 14 at its face in contact with the cam member 13 is provided with a triangular boss 15 engageable with anyone of a plurality of equally radially spaced notches 16 made in the face of cam member 13, adapted to contact flange 14. If desired, a setscrew 17, screwed in nut 12 and engageable with threaded portion 16, is used to lock nut 12, in cam clamping position, in order to make it still more difficult for a child to unscrew nut 12 and thus change the setting of the cam member 13. When the hand grip is in regular position on the handle, the cam member 13 is disposed opposite the throttle lever handle overlying portion 6 and is in the path of the active stroke of said portion. In the position of the cam member 13, shown in FIG. 1, the lever 5 can accomplish a full stroke, whereby the engine can run at its nominal maximum speed. In the position of the cam 13, shown in FIG. 2, with the cam radially outermost portion opposite the lever portion 6, the latter can accomplish a minimum stroke, whereby the maximum engine speed is greatly limited. Any intermediate position between the positions shown in FIGS. 1 and 2 can be obtained by simply rotating the cam member and reclamping it by means of nut 12 and, eventually setscrew 17.

What I claim is:

1. A safety throttle control for a hand-actuated throttle lever of the type pivotally mounted on a vehicle steering handle and having a handle overlying portion normally spaced from the handle, said lever causing vehicle engine acceleration by pivoting said handle overlying portion towards said handle, said control comprising a sleeve-like hand grip adapted to be fitted on said steering handle and having a radially outwardly projecting flange near one end of said handgrip and an externally threaded portion near said flange. An annular eccentric cam member rotatably mounted on said handgrip close to said flange and adapted to be located in the space between said handle and said handle overlying portion, said cam member constituting a throttle lever abutment surface, to adjust the stroke of said throttle lever towards said handle, and a nut in threaded engagement with said threaded portion and adapted to clamp said cam member against said flange in rotatably adjusted position, to thereby adjust the maximum stroke of said throttle lever and, consequently, the maximum speed of the engine.

2. A safety throttle control as claimed in claim 1, wherein the adjacent mutually contacting faces of said cam member and said flange are provided with interengageable means to positively prevent rotation of said cam member with respect to said flange when said cam member is clamped by said nut against said flange.

3. A safety throttle control as claimed in claim 1, wherein the radial face of said cam member facing said flange is provided with a plurality of equally angularly spaced notches and the face of said flange facing said cam member is provided with an axially projecting boss engageable with anyone of said notches.

4. A safety throttle control as claimed in claim 1, further including setscrew means on said nut engageable with said threaded portion to positively lock said nut against rotation.

* * * * *